(12) United States Patent
Kawasaki

(10) Patent No.: US 9,131,575 B2
(45) Date of Patent: Sep. 8, 2015

(54) LED ILLUMINATING METHOD AND APPARATUS FOR IMAGE MEASURING DEVICE

(71) Applicant: MITUTOYO CORPORATION, Kanagawa (JP)

(72) Inventor: Toshio Kawasaki, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/082,474

(22) Filed: Nov. 18, 2013

(65) Prior Publication Data

US 2014/0139133 A1  May 22, 2014

(30) Foreign Application Priority Data

Nov. 19, 2012  (JP) ................................. 2012-253716

(51) Int. Cl.
*G09G 5/10* (2006.01)
*H05B 33/08* (2006.01)

(52) U.S. Cl.
CPC ........ *H05B 33/0845* (2013.01); *H05B 33/0812* (2013.01); *H05B 33/0818* (2013.01); *Y02B 20/343* (2013.01); *Y02B 20/346* (2013.01)

(58) Field of Classification Search
USPC ............................ 345/84, 87, 102, 204, 690
See application file for complete search history.

(56) References Cited

U.S. PATENT DOCUMENTS

| 6,222,628 | B1 | 4/2001 | Corallo et al. | |
|---|---|---|---|---|
| 8,063,920 | B2 * | 11/2011 | De Haan et al. | 345/690 |
| 8,692,818 | B2 * | 4/2014 | Chae et al. | 345/207 |
| 2004/0070987 | A1 | 4/2004 | Iwaki et al. | |
| 2004/0156054 | A1 | 8/2004 | Christoph | |
| 2005/0168492 | A1 * | 8/2005 | Hekstra et al. | 345/690 |
| 2012/0013652 | A1 * | 1/2012 | Onishi et al. | 345/690 |
| 2012/0027307 | A1 | 2/2012 | Naruse | |
| 2012/0194079 | A1 | 8/2012 | Clauberg et al. | |

FOREIGN PATENT DOCUMENTS

| EP | 1059609 | 12/2000 |
|---|---|---|
| EP | 0992763 | 9/2009 |

(Continued)

OTHER PUBLICATIONS

Wang L et al., "A vision-aided alignment datum system for coordinate measuring machines", Measurement Science and Technology, IOP, Bristol, GB, vol. 8, No. 7, XP020064273, Jul. 1, 1997, pp. 707-714.

(Continued)

*Primary Examiner* — Tung X Le
(74) *Attorney, Agent, or Firm* — Greenblum & Bernstein, P.L.C.

(57) ABSTRACT

In an image measuring device that performs, on a work piece to be measured, low brightness continuous illumination and one of stroboscopic illumination and continuous illumination with high brightness, a common high-brightness LED is used, and driving circuits are switched between pseudo-continuous illumination and one of stroboscopic illumination and continuous illumination. In the pseudo-continuous illumination, an average brightness is reduced by pulse lighting. In the stroboscopic illumination, high brightness light is emitted instantaneously. The switching between the pseudo-continuous illumination and one of the stroboscopic illumination and continuous illumination may be performed by changing a lighting cycle of the high-brightness LED.

8 Claims, 8 Drawing Sheets

(56) References Cited

FOREIGN PATENT DOCUMENTS

| | | |
|---|---|---|
| EP | 2159538 | 3/2010 |
| GB | 2194367 | 3/1988 |
| JP | 2004-535587 | 11/2004 |
| JP | 2006-038683 | 2/2006 |
| JP | 2006-135297 | 5/2006 |
| JP | 2008-209420 | 9/2008 |

OTHER PUBLICATIONS

Search report from E.P.O. (EP Appl. No. 13005545.2), mail date is Mar. 21, 2014.
Search report from E.P.O. (EP Appl. No. 13005429.9), mail date is Feb. 24, 2014.
Search report from E.P.O. (EP Appl. No. 14000574.5), mail date is Apr. 29, 2014.

* cited by examiner

Fig. 3A  Pulse lighting cycle

Fig. 3B  Command of stroboscopic illumination

Fig. 3C  Stroboscopic illumination in pulse lighting

Fig. 3D  Stroboscopic illumination in continuous lighting

LED ILLUMINATING METHOD AND APPARATUS FOR IMAGE MEASURING DEVICE

CROSS-REFERENCE TO RELATED APPLICATIONS

The present application claims priority under 35 U.S.C. §119 of Japanese Application No. 2012-253716, filed on Nov. 19, 2012, the disclosure of which is expressly incorporated by reference herein in its entirety.

BACKGROUND OF THE INVENTION

1. Field of the Invention

The present invention relates to LED illuminating method and apparatus for an image measuring device. In particular, the present invention relates to LED illuminating method and apparatus for an image measuring device, which are suitable for use in an image measuring device that uses a common high-brightness LED, and performs low-brightness continuous illumination and high-intensity stroboscopic illumination or high-brightness continuous illumination, on a measuring object (hereafter referred to as "work piece").

2. Description of Related Art

Conventionally, as shown in FIG. 1, a CNC image measuring device performs a measurement of one measuring position, by moving a measuring stage with respect to an imaging device, such as a CCD camera, etc., stopping the measuring stage at the measuring position, acquiring image information of a work piece by adjusting an amount of light of illumination, and setting a measuring tool to and performing image processing, such as an edge detection, on the acquired image information. The measurement is repeatedly performed at all measuring positions, including measurement 1, measurement 2, and so on, to perform measurement of necessary positions. Hereinafter, this measuring mode is referred to as a "standard measuring mode."

On the other hand, in order to improve a measuring throughput, an image measuring device is known, which is provided with a measuring mode in which a measuring operation is performed without stopping the measuring stage with respect to the imaging device at the measuring position. Hereinafter, this measuring mode is referred to as a "non-stop measuring mode." See, for example, Japanese Translation of PCT International Application No. 2004-535587 (paragraphs [0005]-[0006], FIG. 2). As shown in FIG. 2, this image measuring device performs image measuring by inputting instantaneous image information, which is acquired by stroboscopically illuminating the work piece or imaging the work piece with a CCD camera having a shutter, without stopping the measuring stage at measuring positions. The non-stop measuring mode has an advantage that a high-speed measuring is realized without substantially degrading measurement accuracy, by properly setting the relationship between the moving speed of the stage and the width of the stroboscopic pulse.

In recent years, an LED having a higher brightness, i.e. a high-brightness LED, is developed and has become commercially available. Accordingly, the continuous illumination for the standard measuring mode and the stroboscopic illumination for the non-stop measuring mode may be realized with the high-brightness LED.

However, when an LED is continuously lit, e.g., when a work piece is continuously observed in the standard measuring mode, the high-brightness LED, lit with the rated power, is too bright. Therefore, the LED must be driven with a small power. However, the high-brightness LED has characteristics that it is stable in high brightness lighting with a large current, but in low brightness lighting with a small current, a constant brightness cannot be maintained, the brightness varies with time, and thus it is unstable. Accordingly, in order to realize stable low brightness lighting of the high-brightness LED, the power supplied to the LED is reduced, generally by supplying a large current during a LED lighting period, but performing intermittent lighting (pulse lighting).

On the other hand, in the same image measuring device, when an image is acquired while the work piece is moving in the non-stop measuring mode, a method is known in which image data is acquired by performing instantaneous illumination (referred to as stroboscopic light emission) on the work piece by high-brightness light, to prevent image blurring.

In this case, in order to acquire an unblurred image, light emission of the LED requires stroboscopic light having a short lighting interval. In order to acquire an image with a high accuracy, the stroboscopic light must be controlled, with a high degree of accuracy, in such a manner that constant lighting intervals, a constant light amount (brightness or light emission period), and so on, are maintained.

However, when an LED is lit intermittently by giving a command of stroboscopic illumination as shown in FIG. 3B to a light source of pulse lighting as shown in FIG. 3A, it is difficult to reproduce a stable lighting period, due to the difference in cycle between the lighting interval of stroboscopic light emission and the intermittent lighting of pulsed light emission, as shown in FIG. 3C.

A low-brightness LED and a high-brightness LED may be used respectively for continuous illumination and stroboscopic illumination. However, this is not desirable, since the number of optical components increases.

On the other hand, Japanese Patent Application Publication No. 2006-135297 discloses an LED that switches driving current. In Japanese Patent Application Publication No. 2006-135297, when a target value of the amount of light emission is equal to or lower than a predetermined value, a PWM control is performed in which a driving current value is maintained constant at the best current value, and ON and OFF of the driving current is controlled. On the other hand, when the target value of the amount of light emission is higher than the predetermined value, a current value control is performed that changes the continuously supplied driving current value.

However, Japanese Patent Application Publication No. 2006-135297 only discloses a technology that drives an LED with improved luminance efficiency, and does not relate to a technology that switches between continuous illumination and stroboscopic illumination, as disclosed in the present application.

SUMMARY OF THE INVENTION

In view the above circumstances, LED illuminating method and apparatus are provided which use a common high-brightness LED to implement both low brightness continuous illumination, and stroboscopic illumination or continuous illumination with high brightness.

An aspect of the present invention provides an LED illuminating method of an image measuring device that performs, on a work piece to be measured, low brightness continuous illumination and one of stroboscopic illumination and continuous illumination with changing high brightness. The method includes switching driving circuits of a common high-brightness LED, between pseudo-continuous illumination, in which average brightness light incident on the work piece is reduced by pulse lighting, and one of stroboscopic illumination, in which high-brightness light is emitted instantaneously on the work piece, and continuous illumination of the work piece. The high-brightness light may be light incident on the work piece having a brightness higher than the average brightness incident on the work piece. The low brightness light may be light incident on the work piece having a brightness lower than the average brightness incident on the work piece.

The switching between the pseudo-continuous illumination and one of the stroboscopic illumination and the continuous illumination may be performed by changing a lighting cycle of the high-brightness LED.

In another aspect of the present invention, an LED illuminating apparatus for an image measuring device is provided that performs, on a work piece to be measured, low-brightness continuous illumination and one of stroboscopic illumination and continuous illumination with high brightness. The LED illuminating apparatus includes a common high-brightness LED; a pulse lighting circuit that performs pseudo-continuous illumination, in which brightness is reduced by pulse lighting; one of a stroboscopic lighting circuit and a continuous lighting circuit. The stroboscopic lighting circuit performs stroboscopic illumination, in which high brightness light is emitted instantaneously. The LED illuminating apparatus further includes a switch that switches between the pulse lighting circuit and the one of the stroboscopic lighting circuit and the continuous lighting circuit.

The pulse lighting circuit, the one of the stroboscopic lighting circuit and the continuous lighting circuit, and the switch may be configured by a continuous lighting circuit and a lighting cycle changing circuit that switches the pseudo-continuous illumination and the one of the stroboscopic illumination and the continuous illumination by changing a lighting cycle of the high-brightness LED.

According to the features of the present invention, when an image is acquired while a work piece is moving, stroboscopic light having an accurate brightness, timing and lighting period of LED illumination can be provided. Thus, an accurate image can be acquired. Further, when the image measuring apparatus performs continuous observation with low brightness illumination, highly-efficient and stable continuous light can be provided.

Accordingly, it is possible to realize both of stroboscopic illumination with high accuracy and high stability to acquire an image with stroboscopic light or high brightness continuous illumination, and stable low brightness continuous illumination.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the present invention will be described hereinafter with reference to the drawings.

Figure 4:
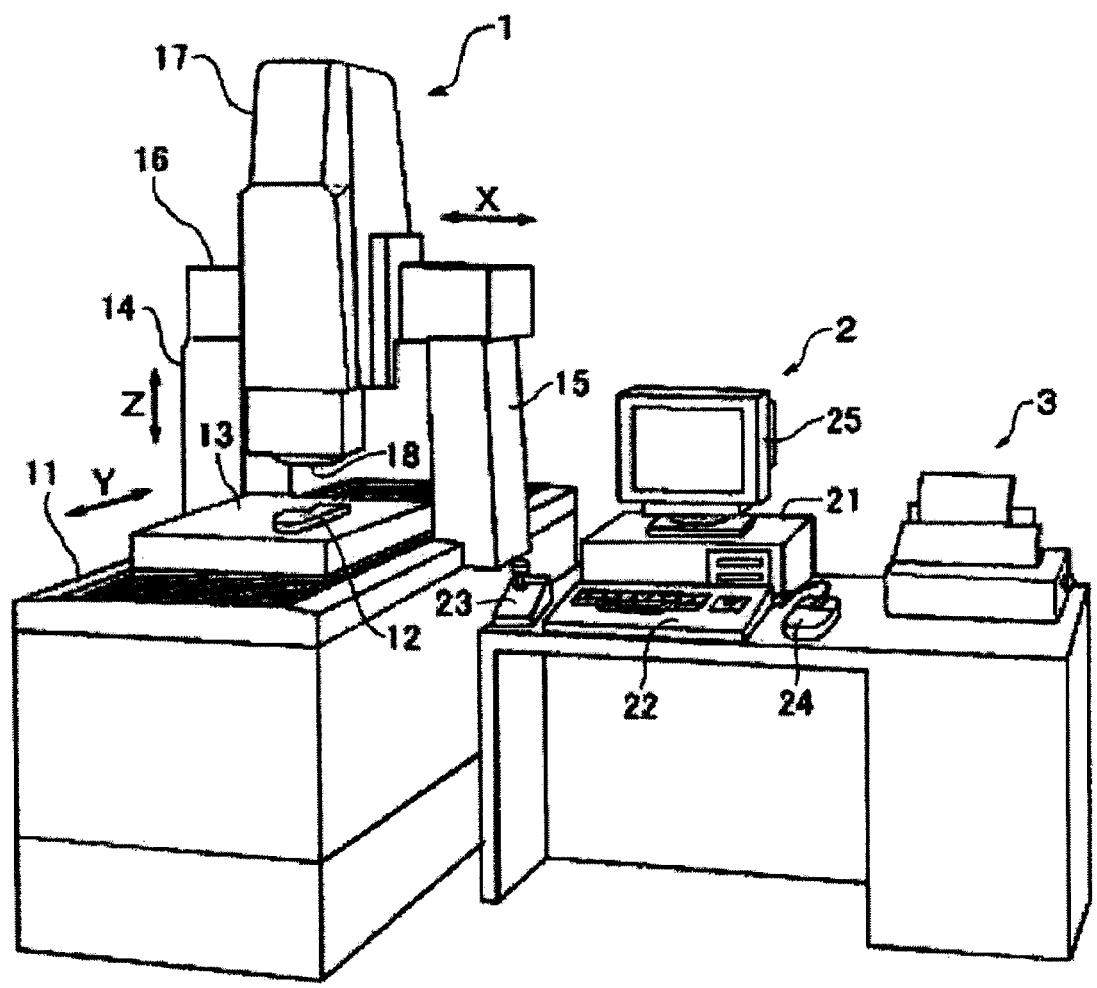
FIG. 4 is a perspective view illustrating an entire configuration of an image measuring system employed in an embodiment of the present invention.

FIG. 4 is a perspective view illustrating an entire configuration of an image measuring system according to an embodiment of the present invention. This system includes a non-contact image measuring device 1, a computer system 2 that drives and controls the image measuring device 1 and performs necessary data processing, and a printer 3 that prints a measured result.

The image measuring device 1 is configured as follows. In other words, a measuring stage 13 is attached on a mount 11 on which a measuring object (hereinafter, referred to as work piece) is placed. The measuring stage 13 is driven in a Y-axis direction (front-back direction of the drawing) by a not-shown Y-axis driving mechanism. Support arms 14 and 15, which extend upward, are fixed at a center of both sides (edges) of the mount 11. An X-axis guide 16 is attached to connect upper end portions of the support arms 14 and 15. An imaging unit 17 is supported by the X-axis guide 16. The imaging unit 17 is driven in an X-axis direction (horizontal direction in the drawing) along the X-axis guide 16 by a not-shown X-axis driving mechanism. A CCD camera 18 is mounted at a lower end of the imaging unit 17 so as to face the measuring stage 13. Further, in the imaging unit 17, in addition to not-shown illuminating device and focusing mechanism, a not-shown Z-axis driving mechanism is provided that moves the position of the CCD camera 18 in a Z-axis direction (vertical direction in the drawing).

Figure 5:
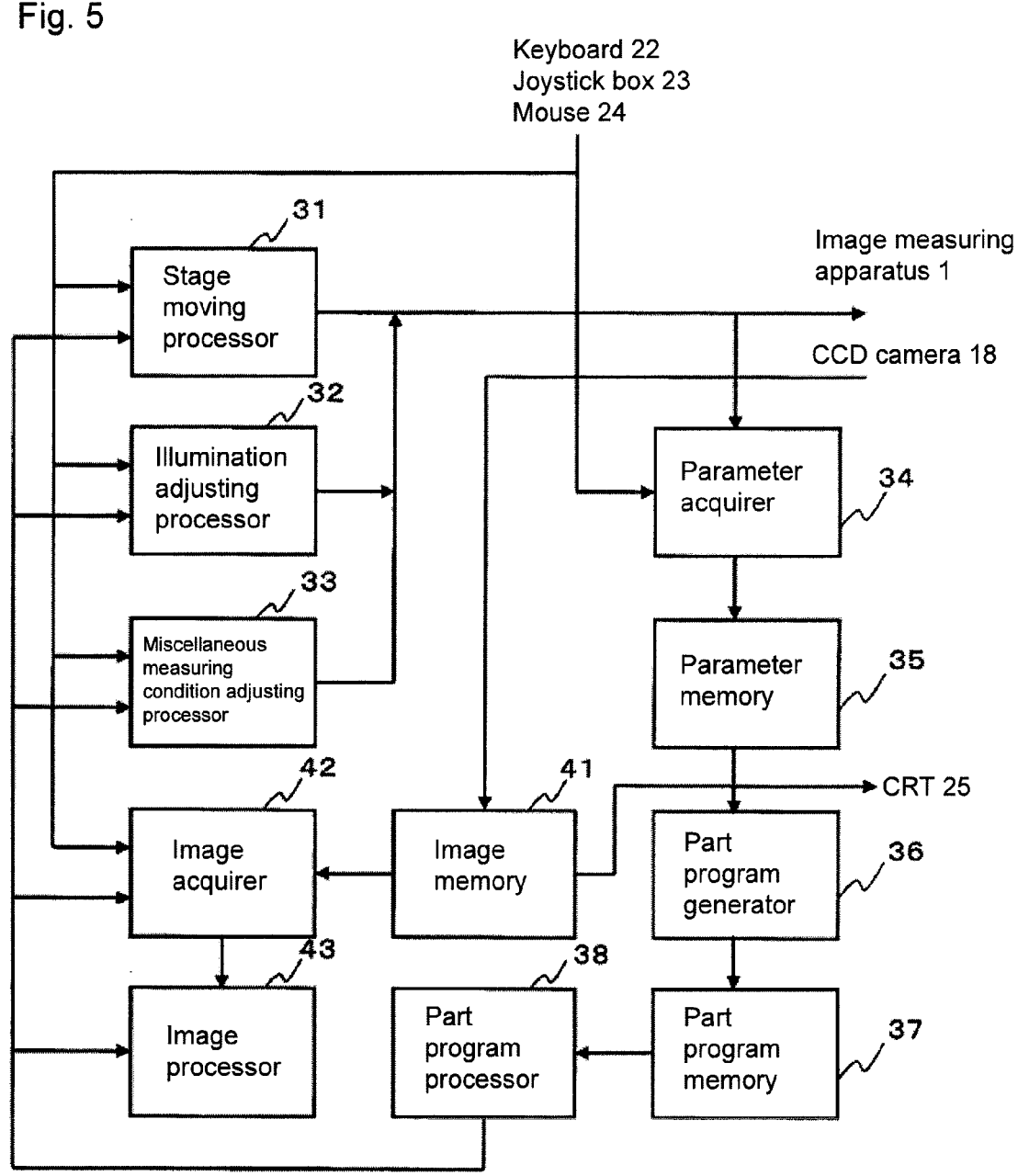
FIG. 5 is a block diagram illustrating functional blocks of a computer according to the embodiment of the present invention.

The computer system 2 is configured to include a computer body 21, a keyboard 22, a joystick box 23, a mouse 24 and a display device (e.g., CRT) 25. The computer body 21 implements each of the functions, for example, shown in FIG. 5, in cooperation with a predetermined program stored therein.

In other words, the computer body 21 includes a stage moving processor 31, an illumination adjusting processor 32 and a miscellaneous measuring condition adjusting processor 33, to control the image measuring device 1 based on the input commands from an input device, including the keyboard 22, the joystick box 23, the mouse 24, and so on. The stage moving processor 31 controls the XYZ-axis driving mechanisms of the image measuring device 1 based on a stage moving command input from the input device, and moves the position of the CCD camera 18 with respect to the measuring stage 13.

Figure 1:
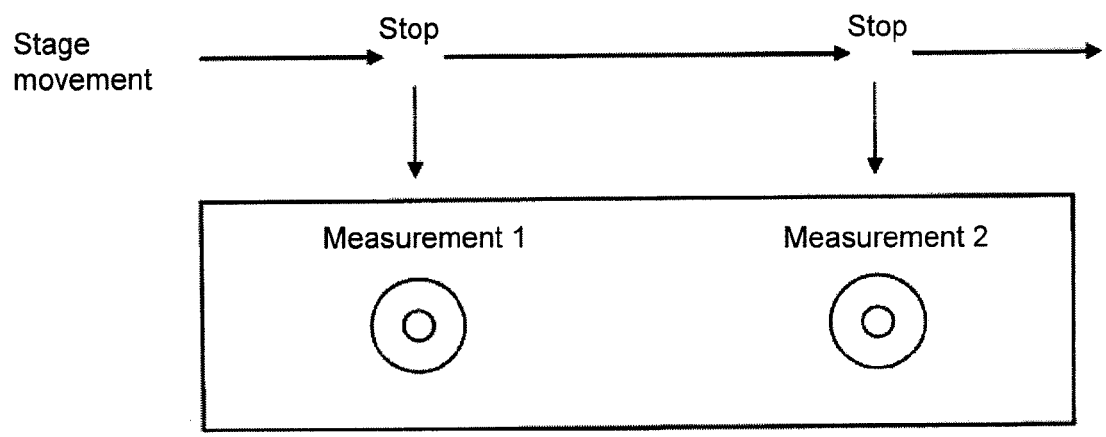
FIG. 1 shows a measuring state of conventional continuous lighting.
Figure 2:
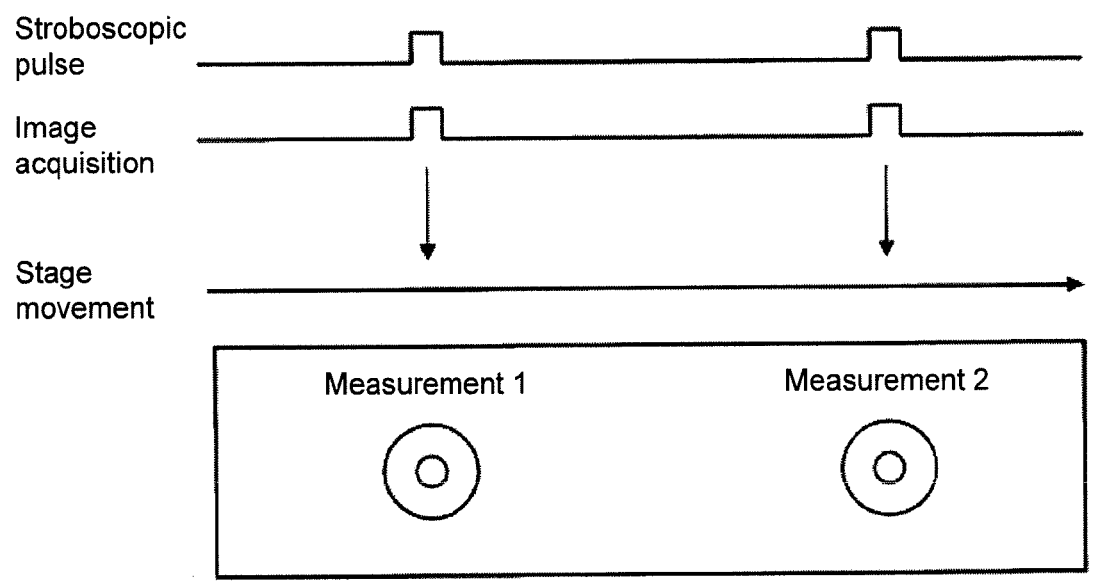
FIG. 2 is shows a measuring state of conventional stroboscopic lighting.
Figure 3:
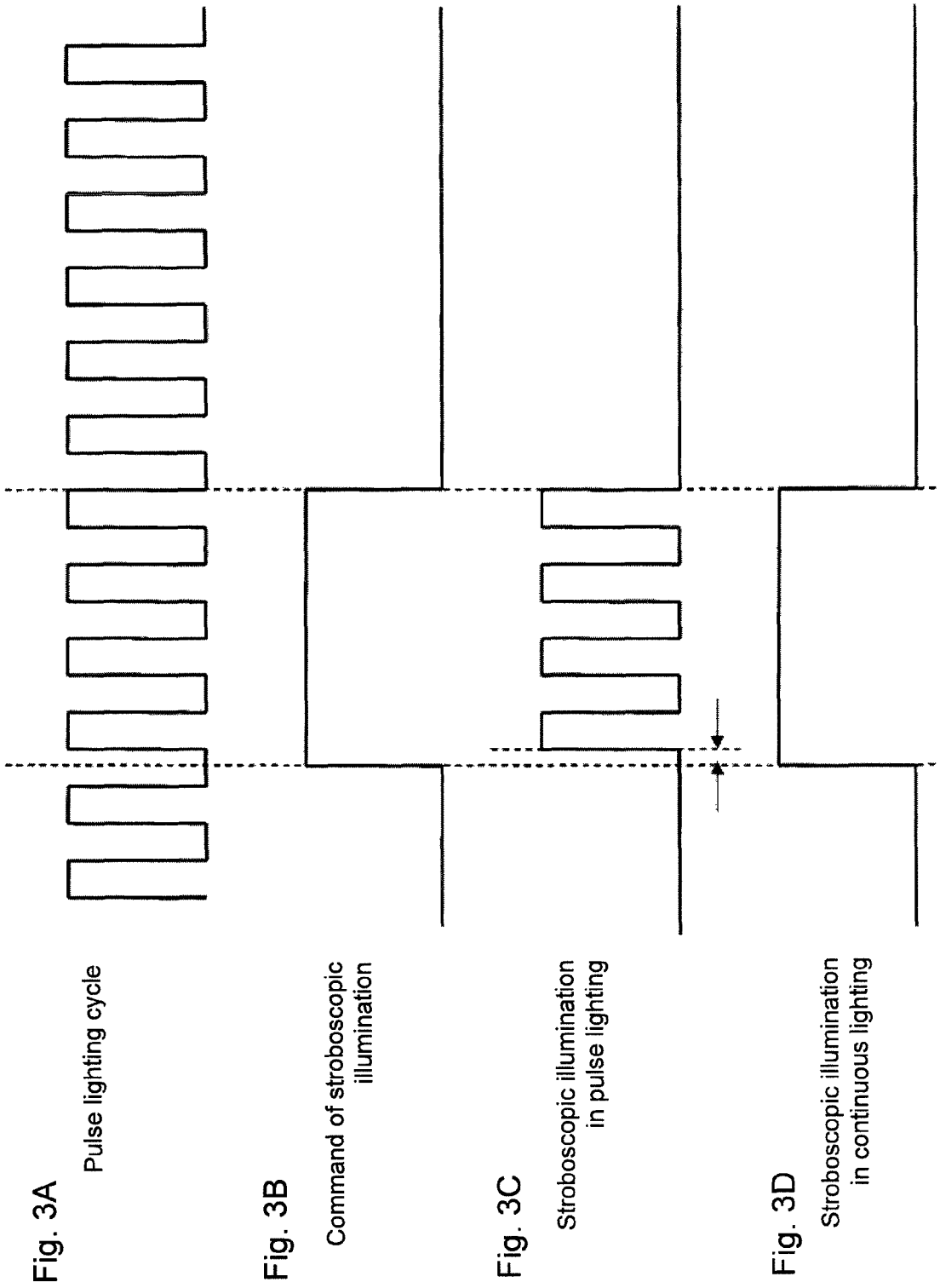
FIGS. 3A-3D are timing diagrams illustrating a phenomenon which occurs in a high-brightness LED.

In the standard measuring mode, the illumination adjusting processor 32 causes the illuminating apparatus of the image measuring device 1 to repeatedly perform pulse lighting at predetermined cycles as shown in FIG. 3A, and adjusts the pulse width of the pulse lighting based on an illumination adjusting command input from the input device. In the non-stop measuring mode, the illumination adjusting processor 32 performs stroboscopic illumination of a preset duration at a designated measuring position, as shown in FIG. 3D.

The miscellaneous measuring condition adjusting processor 33 adjusts other measuring conditions, including a lens magnification, a focusing adjustment, and so on, based on an input miscellaneous measuring condition adjusting command.

A parameter acquirer 34 acquires the stage position, the pulse width information of the stroboscopic illumination, and the other measuring condition information adjusted by each of the processors 31-33, based on a predetermined command input by the input device. The parameters acquired by the parameter acquirer 34 are stored in a parameter memory 35. A part program generator 36 generates a part program for measurement, by utilizing the parameters stored in the parameter memory 35. The generated part program is stored in a part program memory 37.

A part program processor 38 reads a necessary part program from the part program memory 37 and performs the same. The part program processor 38 appropriately drives the stage moving processor 31, the illumination adjusting processor 32, the miscellaneous measuring condition adjusting processor 33, an image acquirer 42, and an image processor 43, in accordance with a variety of commands described in the part program. The image information imaged by the CCD camera 18 is sequentially stored in an image memory 41. The image information stored in the image memory 41 is sequentially displayed by the display device 25, and is captured as a static image by the image acquirer 42 based on the part program. The image processor 43 performs image processing for an image measurement, including measuring tool setting, edge detection and coordinate detection, and so on, on the image information acquired by the image acquirer 42.

Next, a measuring operation of the image measuring system configured as noted above is described, according to the embodiment of the present invention.

Figure 6:
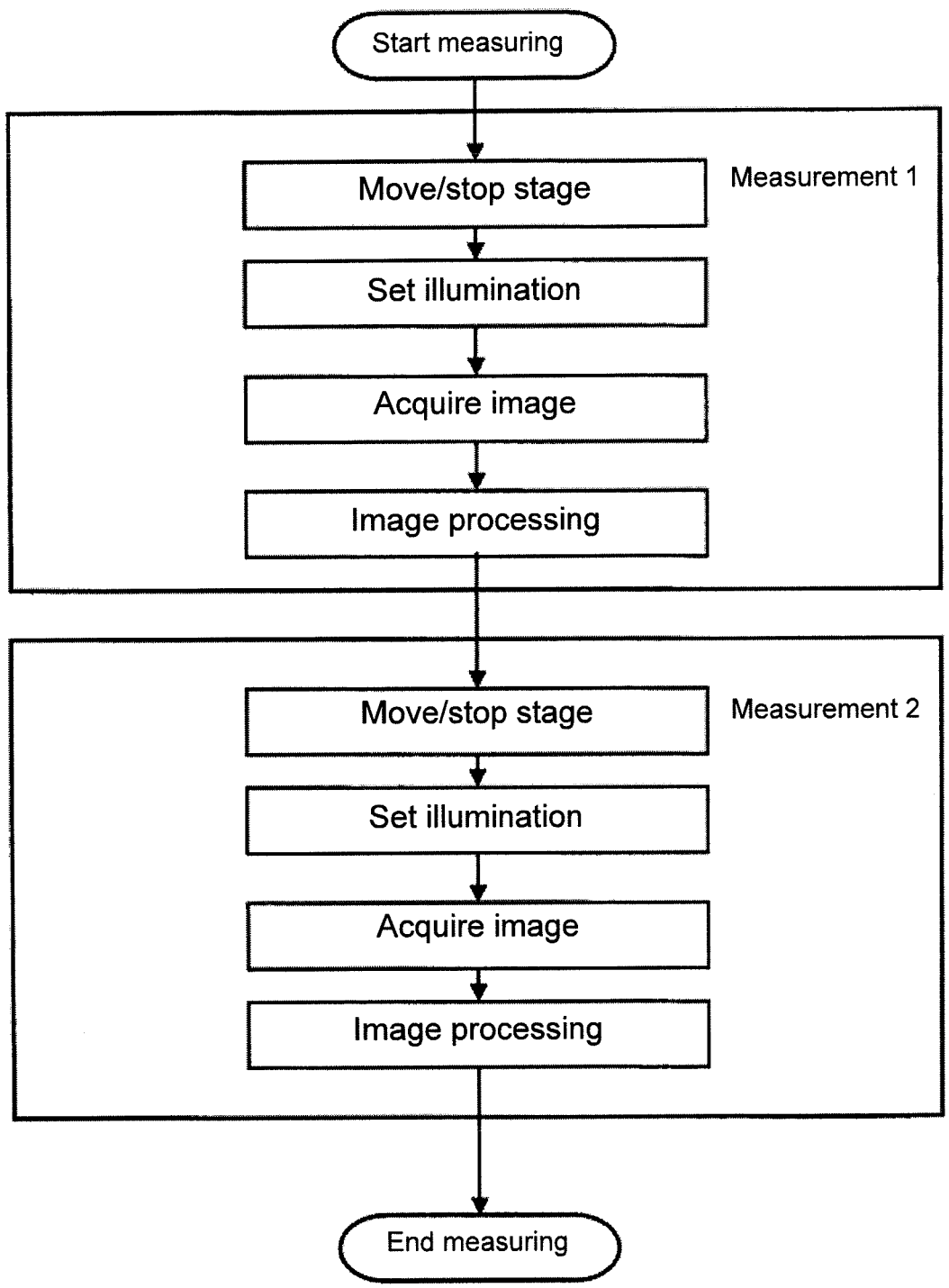
FIG. 6 is a flowchart illustrating a measuring process in a standard measuring mode according to the embodiments of the present invention.

FIG. 6 is a flowchart illustrating an image measuring process in the standard measuring mode. As shown in FIG. 6, during the image measuring in the standard measuring mode, the measurement is performed as follows. In other words, moving/stopping of the measuring stage, illumination setting, image acquiring and image processing are sequentially performed for each measuring element. After the measurement of the position is completed, the system moves to the next measuring position and performs similar processing. Thus, during the image measuring in the standard measuring mode, the measurement is completed at each element (for example, point measurement 1, point measurement 2, . . . ).

Figure 7:
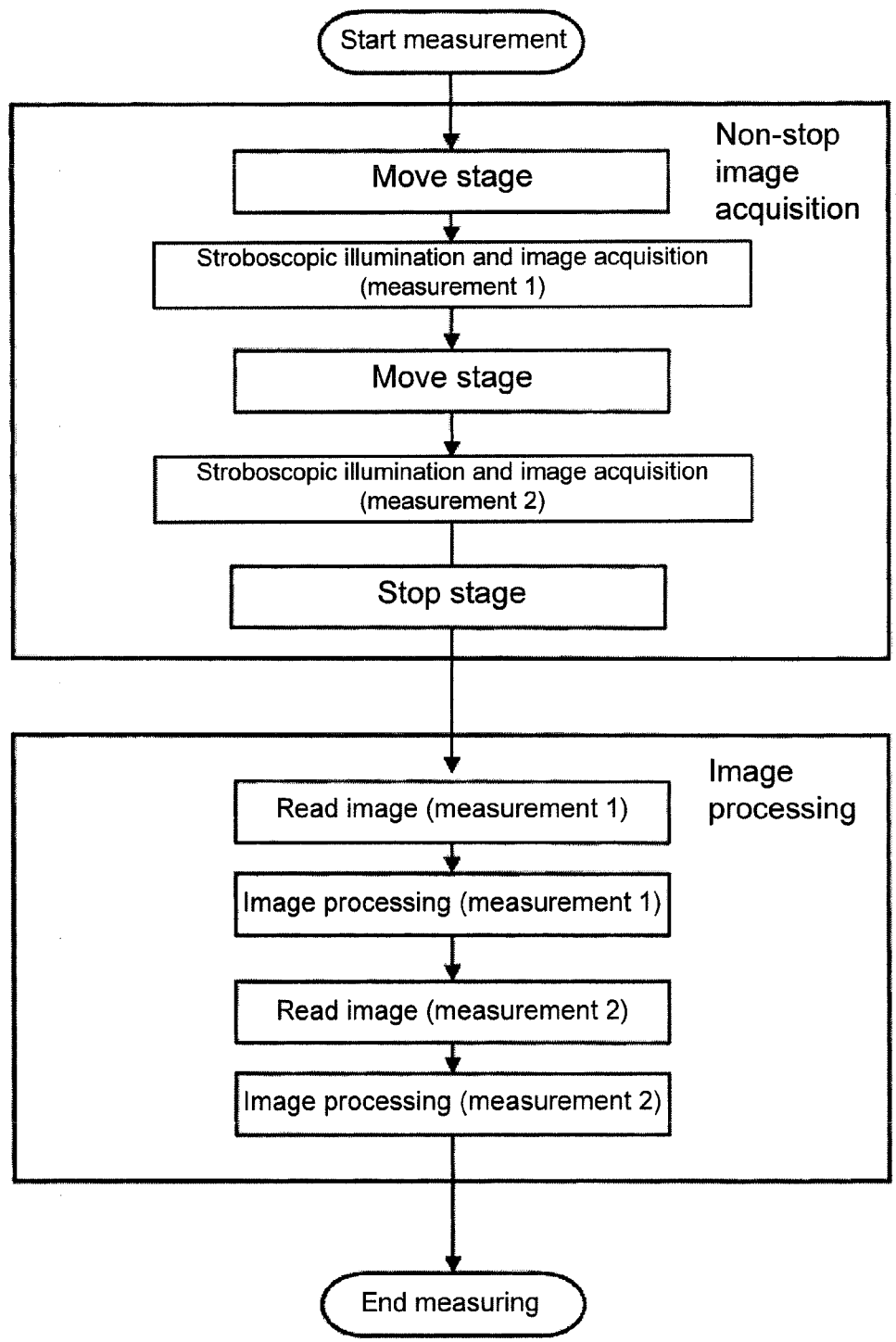
FIG. 7 is a flowchart illustrating a measuring process in a non-stop measuring mode according to the embodiments of the present invention.

On the other hand, during the non-stop measuring mode, as shown in FIG. 7, a measuring process is divided into a non-stop image acquisition and image processing. In the non-stop image acquisition, while the relative position between the measuring stage 13 and the CCD camera 18 moves along a measuring path that passes each measuring position, the stroboscopic illumination and image acquisition (and storing) are performed at moment of passing by the measuring position, continuously at all measuring positions. When all image acquisitions are completed, the stage is stopped and image processing is performed. In the image processing, the acquired and temporarily stored image information is read one by one, and image processing, such as edge detection, is performed continuously for all measuring positions. In the non-stop measuring mode, unlike the standard measuring mode, it is not necessary to confirm that the stage has stopped at each measuring position. Accordingly, the measuring operation can be accelerated.

Figure 8:
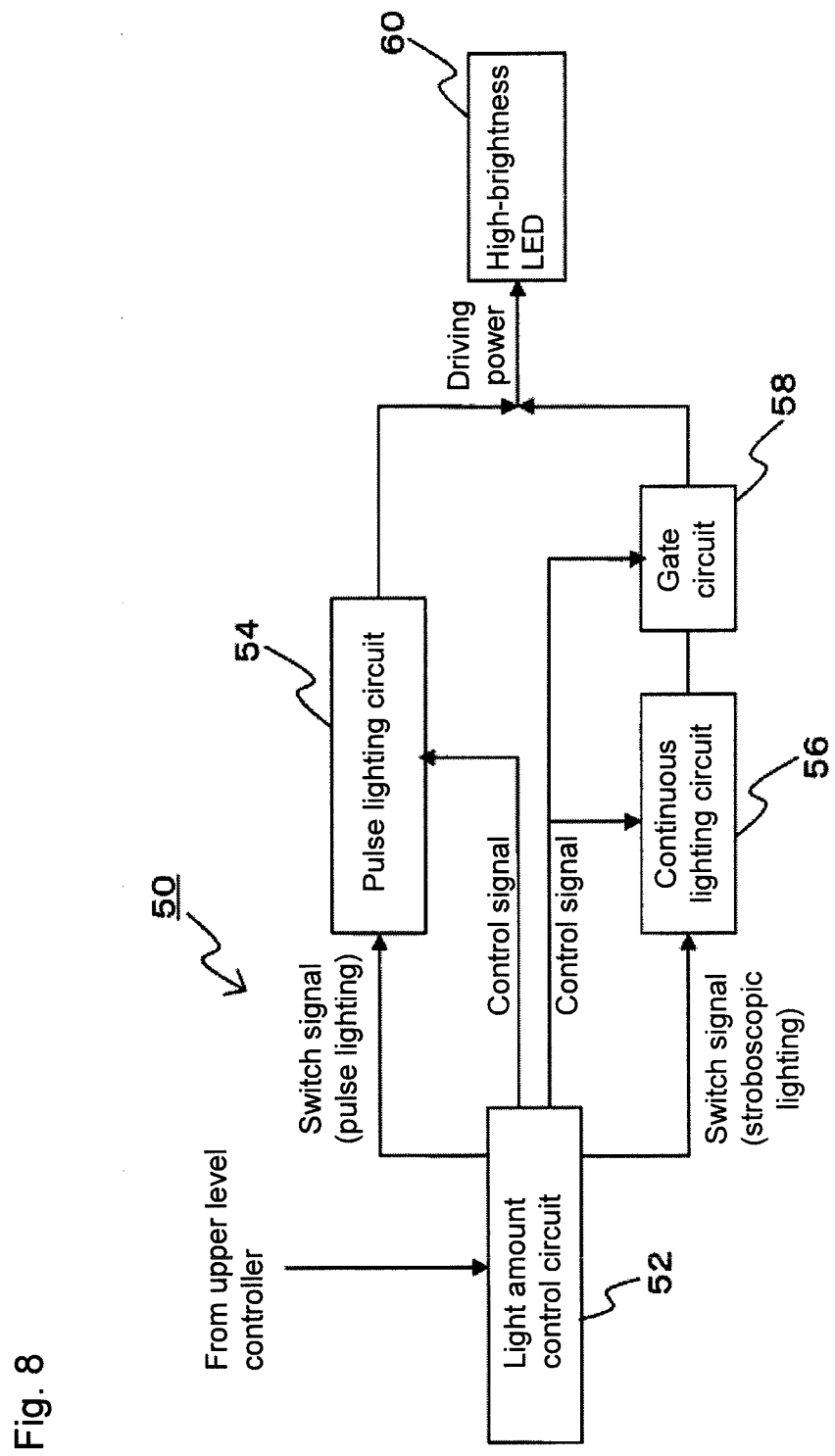
FIG. 8 is a block diagram illustrating an illumination circuit according to a first embodiment of the present invention.

In the first embodiment of the present invention, the illumination control device 50 includes a light amount control circuit 52, a pulse lighting circuit 54, a continuous lighting circuit 56 and a gate circuit 58, as shown in FIG. 8. The illumination control device 50 drives the high-brightness LED 60 based on a command from the illumination adjusting processor 32 of the computer system 2, which is a upper level controller. The pulse lighting circuit 54 performs pulse lighting of the high-brightness LED 60. The continuous lighting circuit 56 and the gate circuit 58 together perform stroboscopic lighting of the same high-brightness LED 60.

The light amount control circuit 52 receives a pulse lighting command and a stroboscopic lighting command from the illumination adjusting processor 32, supplies to the pulse lighting circuit 54 a control signal, including a pulse width, a cycle length, an output voltage/current, etc., which is required by the pulse lighting circuit 54 during the pulse lighting. The light amount control circuit 52 also supplies, to the continuous lighting circuit 56 and the gate circuit 58, a control signal, including a stroboscopic lighting time, a lighting interval, an output voltage/current, etc., which is required by the continuous lighting circuit 56 and the gate circuit 58 during the stroboscopic lighting. Further, the light amount control circuit 52 switches the driving power supplied to the high-brightness LED 60, depending on the purpose of the LED illumination, by turning on one of the pulse lighting circuit 54 and the pair of the continuous lighting circuit 56 and the gate circuit 58, and turning off the other, based on a command from the illumination adjusting processor 32.

According to this embodiment, the pulse lighting circuit 54, which is optimized for the pulse lighting, is provided separately and independently from the continuous lighting circuit 56, which is optimized for the continuous lighting. Therefore, it is possible to perform optimum lighting for each of them.

Figure 9:
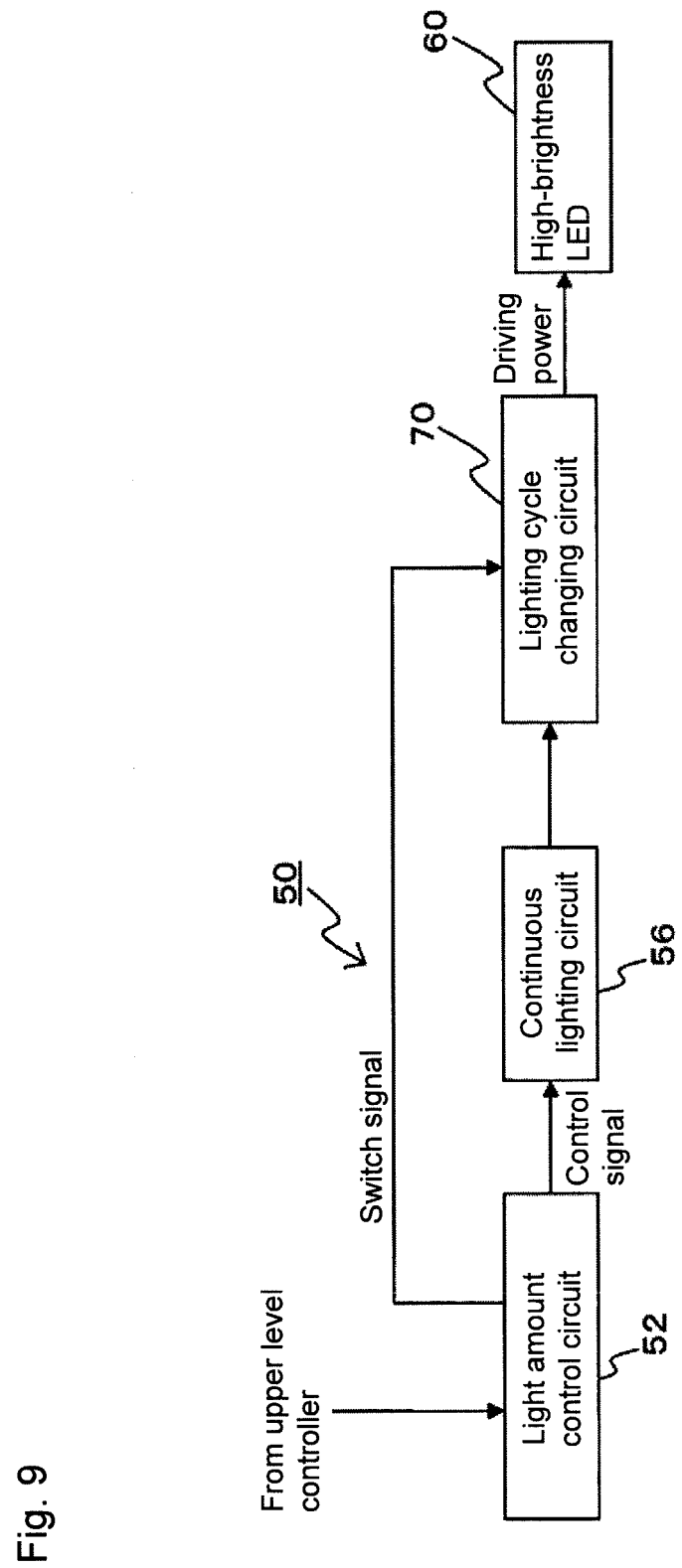
FIG. 9 is a block diagram illustrating an illumination circuit according a second embodiment of the present invention.

Next, FIG. 9 shows the illumination control device 50 according a second embodiment of the present invention.

In this embodiment, a lighting cycle changing circuit 70 is provided at an output side of the continuous lighting circuit 56, which is common to the pulse lighting and the stroboscopic lighting. Thus, the pulse lighting and the stroboscopic lighting are performed by changing the lighting cycle of the lighting cycle changing circuit 70 based on an output of the light amount control circuit 52.

According to this embodiment, it is not necessary to provide the pulse lighting circuit separately and independently from the stroboscopic lighting circuit. Accordingly, the configuration is simple and inexpensive.

Further, according to this embodiment, the gate circuit 58 is provided in the illumination control device 50 to perform stroboscopic light emission. However, when a static image is acquired by a shutter of the CCD camera 18, the gate circuit 58 may be omitted, and the continuous lighting circuit 56 causes the high-brightness LED 60 light continuously during the non-stop measuring mode.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An LED illuminating method of an image measuring device that performs, on a work piece to be measured, low brightness continuous illumination and one of stroboscopic illumination and continuous illumination with high brightness, the method comprising:

switching driving circuits of a common high-brightness LED, between pseudo-continuous illumination, in which an average brightness is reduced by pulse lighting, and one of stroboscopic illumination, in which high-brightness light is emitted instantaneously, and continuous illumination.

2. The LED illuminating method of the image measuring device according to claim 1, wherein the switching between the pseudo-continuous illumination and one of the stroboscopic illumination and the continuous illumination comprises changing a lighting cycle of the high-brightness LED.

3. The LED illumination method according to claim 1, wherein the switching utilizes continuous illumination when the work piece is stationary, and utilizes pulse lighting when the work piece is moving.

4. The LED illumination method according to claim 1, further comprising illuminating the entire work piece with a single illumination mode of either pulse lighting or continuous illumination.

5. An LED illuminating apparatus for an image measuring device that performs, on a work piece to be measured, low-brightness continuous illumination and one of stroboscopic illumination and continuous illumination with high brightness, the LED illuminating apparatus comprising:

a high-brightness LED;

a pulse lighting circuit configured to perform pseudo-continuous illumination, in which brightness is reduced by pulse lighting;

one of a stroboscopic lighting circuit and a continuous lighting circuit, the stroboscopic lighting circuit configured to perform stroboscopic illumination, in which high brightness light is emitted instantaneously; and a switch that is switchable between the pulse lighting circuit and the one of the stroboscopic lighting circuit and the continuous lighting circuit.

6. The LED illuminating apparatus for the image measuring device according to claim 5, wherein the pulse lighting circuit, the one of the stroboscopic lighting circuit and the continuous lighting circuit, and the switch comprise a continuous lighting circuit and a lighting cycle changing circuit switchable between the pseudo-continuous illumination and the one of the stroboscopic illumination and the continuous illumination by changing a lighting cycle of the high-brightness LED.

7. The LED illuminating apparatus according to claim 5, wherein the switch switches to the continuous lighting circuit when the work piece is stationary and switches to the pulse lighting circuit when the work piece is moving.

8. The LED illuminating apparatus according to claim 5, wherein the switch is configured to illuminate the entire work piece according to one of the pulse lighting circuit and the continuous lighting circuit.

\* \* \* \* \*